United States Patent [19]

Fischer et al.

[11] 4,393,824
[45] Jul. 19, 1983

[54] HEATING SYSTEM

[75] Inventors: Friedrich B. Fischer, Cologne; Gottfried Moser, Bergisch Gladbach, both of Fed. Rep. of Germany

[73] Assignee: Klockner-Humboldt-Deutz AG, Cologne, Fed. Rep. of Germany

[21] Appl. No.: 312,758

[22] Filed: Oct. 19, 1981

[30] Foreign Application Priority Data

Oct. 18, 1980 [DE] Fed. Rep. of Germany ....... 3039372

[51] Int. Cl.³ .............................................. F01M 1/00
[52] U.S. Cl. ........................ 123/196 AB; 123/196 R; 123/142.5 R; 184/6.22; 184/104 A
[58] Field of Search ........ 123/196 AB, 195 A, 198 C, 123/196 S, 142.5 R, 196 R, 196 A, 196 CP; 126/247; 237/1 R, 12.3 A; 184/104 A, 6.22

[56] References Cited

U.S. PATENT DOCUMENTS

| 2,764,147 | 9/1956 | Brunner | 126/247 |
| 3,465,847 | 9/1969 | Donathal | 123/196 AB |
| 3,813,036 | 5/1974 | Lutz | 126/247 |
| 4,136,824 | 1/1979 | Kallenbach | 237/12.3 A |
| 4,249,491 | 2/1981 | Stein | 123/142.5 |

FOREIGN PATENT DOCUMENTS 2628697 1/1977 Fed. Rep. of Germany .

Primary Examiner—Charles J. Myhre
Assistant Examiner—E. Rollins Cross
Attorney, Agent, or Firm—Watson, Cole, Grindle & Watson

[57] ABSTRACT

A heating system for heating the oil of a machine having a hydraulic or lubricating oil system includes a high-pressure supply pump and a throttling element for heating the medium while reducing the pressure, the pump supplying the lubricating points of the machine at the reduced pressure either via the pressure-reducing element or via a by-pass thereto with a low flow resistance. Heat removed from the heating medium by a heat exchanger may be transferred to the service cabin of the machine for space heating purposes.

12 Claims, 5 Drawing Figures

HEATING SYSTEM

BACKGROUND OF THE INVENTION

This invention relates generally to a system for quickly heating the oil in the main oil conduit of an internal combustion engine before reaching the oil lubricating points of the engine, the excess heat generated being capable of heating the service cabin of a motor vehicle powered by the engine.

Published German Application No. 26 28 697 discloses a hydraulic heating system for a motor vehicle including a pump connected to a drive motor and a variable conductance load element at the pressure side of the pump for reducing pressure and elevating the temperature of the pumped oil. The pump is a hydraulic pump provided in a separate oil conduit system which contains the load element as well as an oil/air heat exchanger.

SUMMARY OF THE INVENTION

An object of the present invention is to improve upon the heating device of the aforedescribed type, such that a more compact design of system components of the heater is achieved thereby saving material and space.

In accordance with the invention, in a machine having a lubricant and/or working fluid system, the lubricant or the working fluid constitutes the heating medium, and oil lubricating points or intake points of the working fluid are connected to a high-pressure supply pump and a pressure-reducing element for reducing the pumped pressure and elevating the temperature of the heating medium before being pumped into the oil lubricating or intake points.

In such manner, a special lubricating-oil pump for supplying the working fluid can be dispersed with, since the functions of such a pump are performed by the high-pressure supply pump utilized to generate heat. Thus, the device for heating the heating medium, which heretofore has been designed as an additional independent oil circulation system, is fully integrated, and corresponding line sections can be eliminated.

Further, according to the invention, the main oil conduit of the oil distribution system has a line by-passing the pressure-reducing element, such by-pass line having a flow control valve for regulating the temperature of the oil fed into the oil distribution or working fluid intake points.

A still further object of this invention is to provide such a system wherein an oil cooling heat exchanger may be coupled into the main oil conduit between the by-pass line and the oil distribution or working fluid intake points, and a line by-passing such heat exchanger having a control element, whereby the oil may be optionally heated upon passing through the pressure-reducing element, may by-pass such element where the temperature thereof is adequate, or may be cooled by the heat exchanger or by-pass same thereby controlling the oil temperature level before reaching such points.

A still further object of this invention is to provide such a system wherein such heat exchanger is of the water/oil type that is coupled into the water circulation system of a water cooled engine to thereby remove heat from the oil conduit and elevate the water temperature so that heat may be transferred to the service cabin of a motor vehicle powered by the engine via a space heat exchanger located in such cabin.

A still further object is to provide such a system wherein a space heat exchanger is directly coupled into the main oil conduit outside the crankcase without the provision of the oil cooling heat exchanger, the space heat exchanger being located in the service cabin of a motor vehicle powered by an air cooled engine for heating the cabin area thereof.

A still further object of the invention is to provide such a heating system wherein the space heat exchanger is coupled into the main oil conduit outside the crankcase together with the oil cooling heat exchanger whereby the heated oil, depending on its temperature level, may be cooled or by-pass the oil cooling heat exchanger with the excess heat used to heat the service cabin.

Other objects, advantages and novel features of the invention will become more apparent from the following detailed description of the invention when taken in conjunction with the accompanying drawings.

DETAILED DESCRIPTION OF THE INVENTION

Figure 1:
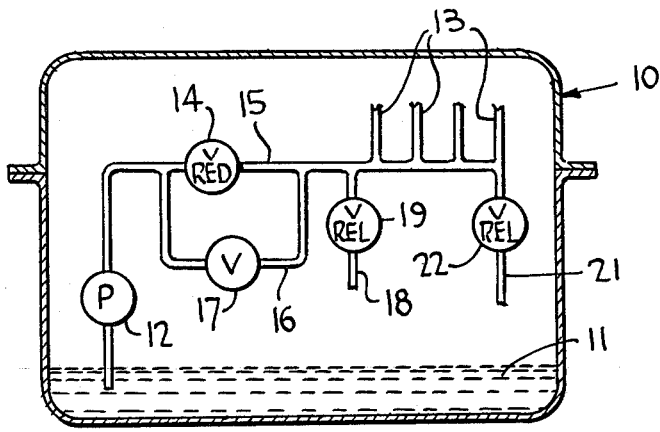
FIG. 1 is a basic layout of the arrangement embodying the invention for heating the oil charge in the main oil circuit of an internal combustion engine.

Turning now to the drawings wherein like reference characters refer to like and corresponding parts throughout the several views, schematically shown in FIG. 1 is a crankcase 10 containing an oil pump 11 of an internal combustion engine (not otherwise shown) from the charge of which a high-pressure supply pump 12 suctions oil to supply critical points (hereinafter referred to as oil distributing points) 13 in the engine via a pressure-reducing element 14 in a main oil conduit 15, or via a line 16 which by-passes element 14 and which contains a flow control element in the form of a valve 17. It should be pointed out that points 13 may likewise represent intake points of a working fluid system for a work implement operatively connected with the internal combustion engine. Main fluid conduit 15 has a line 18 which branches away between by-bass line 16 and oil distributing points 13, this branch line terminating in a pressure-release valve 19, and another line 21 branches away from main conduit 15 downstream of oil distributing points 13 and contains a pressure release valve 22. This pressure release valve 22 is set at a pressure level lower than the level at which valve 19 is set for regulating the pressure of the oil flowing into the oil distributing points and for regulating the pressure level of the oil distributing points themselves.

In the hydraulic system, a relatively high pressure level is permissable or even desireable, although the high pressure level of high pressure supply pump 12 of about 150 bar, has been heretofore considered imcompatible with the design of a lubricating oil system shown in FIG. 1. In accordance with the invention, the oil may be pumped either through pressure-reducing element 14, which may be in the form of a throttle valve having a fixed throttle opening, for thereby reducing the high pressure and accordingly generating heat, or through by-pass line 16 when the temperature level of the lubricating oil is sufficiently high to effect fast heating of the lubricant or working fluid. Cold oil, known to be quite viscous is slow to reach the engine bearings via the oil distributing points or galleries in the engine. Moreover, at low engine temperatures, there is a tendency for corrosive products of combustion to condense on the cylinder walls. The fact oil heating system according to the invention avoids the problems in dealing with cold lubricants before the engine has warmed up. Pressure release valves 19 and 22 may be manually adjusted for controlling the pressure level for lubricating points 13.

In the remaining drawing Figures, the arrangement for heating the oil charge with high-pressure supply pump 12, pressure-reducing element 14, control element 17 and including branch line 18 containing valve 19, is identical to FIG. 1. For cooling the lubricating oil and for carrying out certain heating operations with units connected with the internal combustion engine and operated thereby, heat exchangers and oil coolers are arranged such as to effect a combined lubricating-oil and heating-oil system.

Figure 2:
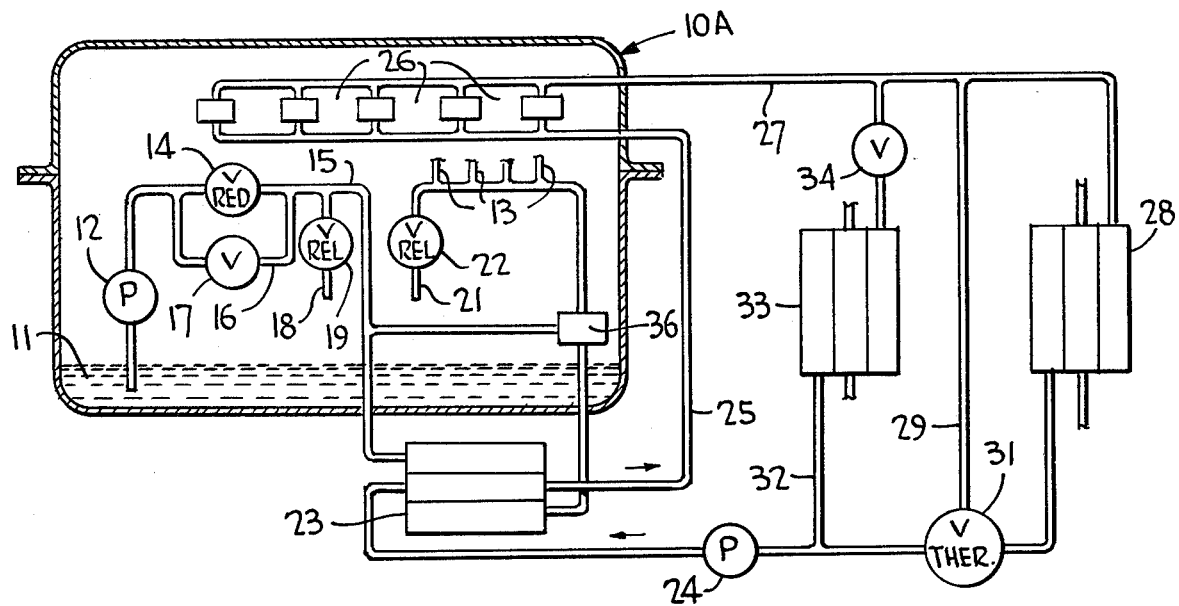
FIG. 2 is a schematic illustration of a water circulation system of a water-cooled internal combustion engine coupled together with the oil distribution system of FIG. 1 for heating the service cabin of a motor vehicle powered by the engine.

In the simplest arrangement for a water-cooled internal combustion engine shown in FIG. 2, a water/oil heat exchanger 23 is located in main conduit 15 between pressure-reducing element 14 and lubricating points 13. Also, this heat exchanger is integrated into the water cooling circuit of the engine. The cooling water is circulated in the direction of the arrows of FIG. 2 by a water pump 24 and flows via heat exchanger 23 and flow line 25 to crankcase 10A which is provided with cooling-water compartments 26. Via return line 27 from the crankcase, the cooling water reaches a precooler 28 for reducing the level of the water temperature by removing heat before returning back to heat exchanger 23. The precooler has a by-pass line 29 controlled by a thermostatic valve 31 to thereby regulate the temperature of the water returning back to heat exchanger 23.

Another line 32 by-passes the precooler and contains an air/water space heat exchanger 33 and a valve control 34. This heat exchanger may be located in the service cabin of a motor vehicle powered by the internal combustion engine for heating the service cabin area by the heat removed from the heated fluid passing through conduit 15 before reaching distributing points 13. And, heat exchanger 23 is provided with a by-pass line 35 having a control element 36 for thermostatically adjusting the by-pass in relation to a maximum lubricating-oil temperature for the lubricating points. It can be therefore seen that the oil in the main oil conduit may be heated via element 14, or by-pass same depending on the temperature level and reach points 13 directly via line 35, or the excess heat may be removed by oil cooling exchanger 23 and transferred to the service cabin via exchanger 33. Or, the water in the water circuit may be precooled or by-pass both exchangers 28 and 33 depending on the water temperature level.

Figure 3:
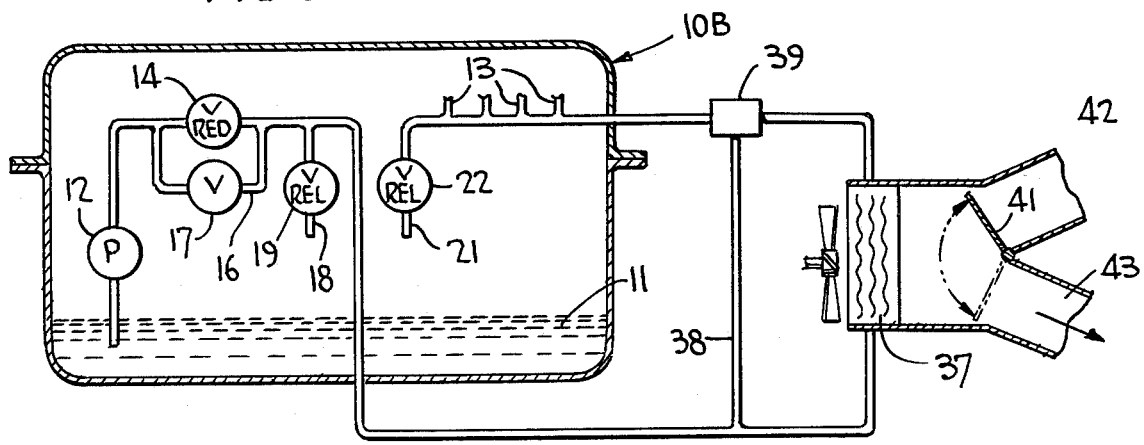
FIG. 3 is a schematic illustration of an air cooled internal combustion engine with which the FIG. 1 oil distribution is associated for heating the service cabin of a motor vehicle powered by the engine.

In FIG. 3 the internal combustion engine has an air-cooled crankcase 10B. Main oil conduit 15 extends downstream of branch line 18 to lubricating points 13 via an air/oil heat exchanger 37 directly coupled into the main oil conduit outside the crankcase without the provision of an oil cooling exchanger, space heat exchanger 37 being located in the service cabin of a motor vehicle powered by the air-cooled engine. Heat exchanger 37 has a by-pass line 38 controlled by a control element 39. A reversible air duct may be provided so that the air which passes through exchanger 37 is reversible by means of an air regulator 41 between a hot-air duct 42 and an exhaust-air duct 43. Thus, heat exchanger 37 is capable of recooling the oil flowing therethrough as well as heating the service cabin depending on the control of air regulator 41.

Figure 4:
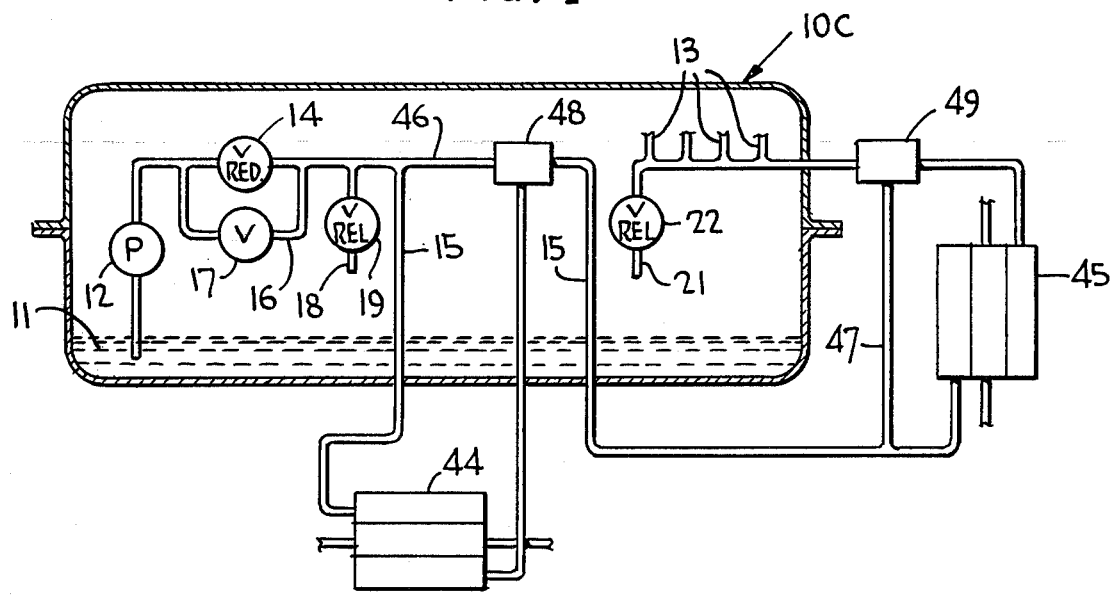
FIG. 4 is a view similar to FIG. 3 but with an air/oil heat exchanger for cooling the fluid before reaching the oil distribution points or before reaching a cabin area heat exchanger.

The arrangement in FIG. 4 is similar to FIG. 3 except that crankcase 10C of the internal combustion engine has an air/oil heat exchanger 44 arranged in main oil conduit 15 between pressure-reducing element 14 and distributing points 13 for removing heat from the oil in the main conduit for the control of a heat exchanger 45. This heat exchanger is located in the service cabin of the motor vehicle powered by the engine for heating the service cabin are thereof. Lines 46 and 47, having control elements 48 and 49 therein, respectively by-pass exchangers 44 and 45. Thus, depending on the temperature level of the pumped oil, it may by-pass element 14, exchanger 44 and/or exchanger 45 when proceeding toward oil distributing points 13, may be heated at 14, cooled at 44, and excess heat transferred at 45, or any combination of the above.

Figure 5:
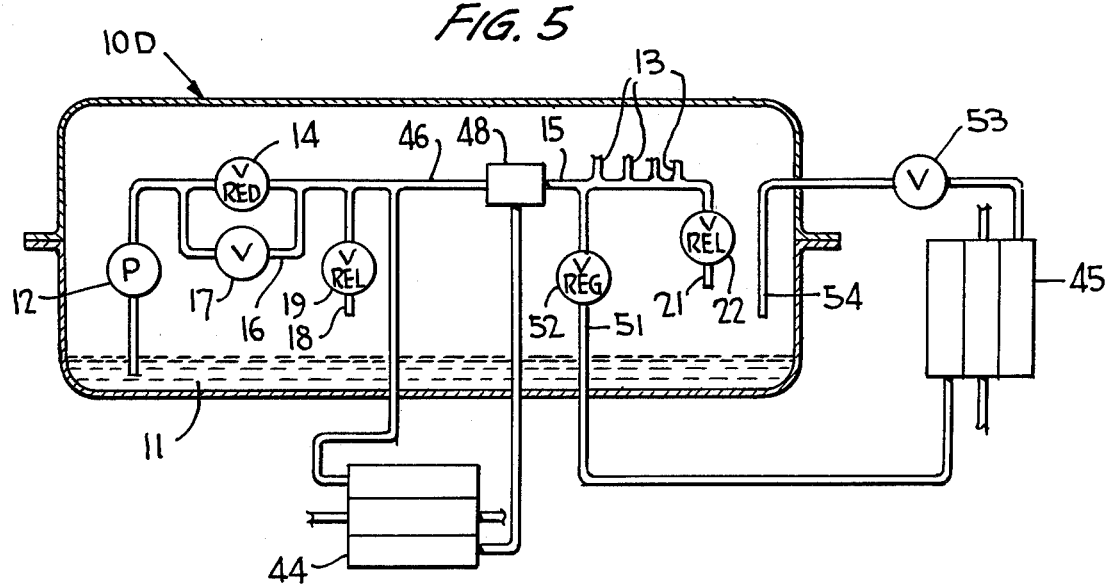
FIG. 5 is a view similar to FIG. 4 except that the service area heat exchanger is located in a secondary oil conduit which branches off the main oil conduit.

The arrangement of FIG. 5 differs from that of FIG. 4 in that main oil conduit 15 continues downstream of control element 48 directly to distributing points 13 of the internal combustion engine and to pressure release valve 22. An auxiliary oil conduit 51 branches from conduit 15 upstream of the distributing points 13 and contains a throttle device 52 for controlling the oil temperature level reaching heat exchanger 45. A control valve 53 in the conduit 51 controls the quantity of oil returning practically unpressurized to oil sump 11 via a return line 54. An advantage of this arrangement is a uniform temperature of the oil distributing points which is limited by the controlled oil cooling.

Flow control valve 17 in line 16 by-passing the pressure-reducing element may comprise a solenoid shutoff valve which can be actuated by various parameters independently of one another such as, for example, a limit switch on the accelerator of the motor vehicle driven by the internal combustion engine, a pressure switch in a working hydraulic system of auxiliary equipment having a pump driven by the internal combustion engine, a thermosensitive switch in the oil sump, etc. Such is illustrated and described in more detail in co-pending application Ser. No., 297,254 filed Aug. 28, 1981 and commonly owned herewith. In such manner, it is assured that, when required, the full engine power is available by opening the by-pass. Also, by-pass to the pressure-reducing element remains closed until the heating medium has attained the temperature which is adequate for optimum performance of the engine.

Obviously, many other modification and variations of the present invention are made possible in the light of the above teachings. It is therefore to be understood that within the scope of the appended claims the invention may be practiced otherwise than as specifically described.

What is claimed is:

1. In an internal combustion engine having an oil distribution system normally operable at a predetermined pressure level, said system including a main oil conduit, a pump for suctioning oil from an oil sump of the engine and feeding the oil to oil distributing points or galleries of said oil distribution system, an oil heating system comprising solely said oil distribution system wherein said pump comprises a high-pressure pump producing a pressure of about one order of magnitude higher than said predetermined level, a pressure-reducing element in said conduit between said pump and said oil distributing points for reducing the oil pressure flowing therethrough and thereby increasing the oil temperature before the oil reaches said oil distributing points or galleries of said oil distribution system.

2. The oil heating system according to claim 1, wherein a first line is provided in said main oil conduit by-passing said pressure-reducing element, a flow control valve provided in said line for regulating the temperature of oil fed into said distribution points.

3. The oil heating system according to claim 1, wherein said engine has a water distribution system for cooling and includes a water conduit containing a water pump, a water/oil heat exchanger disposed in said oil conduit between said pressure-reducing element and said oil distribution points, a second line in said oil conduit by-passing said heat exchanger, a control element in said second line for regulating the flow of oil through said heat exchanger, and said heat exchanger being integrated into said water conduit, and an air/water heat exchanger in said water circuit and being disposed in the service cabin of said motor vehicle, whereby the oil may be cooled via said water/oil heat exchanger and the water flowing through said water conduit is thereby heated for heating the area of the service cabin via said air/water heat exchanger.

4. The oil heating system according to claim 1, wherein a first air/oil heat exchanger is disposed in said oil conduit between said pressure-reducing element and said oil distribution points, said heat exchanger being capable of heating the service cabin area of a motor vehicle powered by said engine.

5. The oil heating system according to claim 4, wherein a second air/oil heat exchanger is disposed in said oil conduit between said pressure-reducing element and said oil distribution points, said second heat exchanger cooling the oil flowing through said conduit before reaching said distribution points, and a second line in said conduit by-passing said second heat exchanger and having a control element for regulating the flow of oil therethrough.

6. The oil heating system according to claim 5, wherein another oil conduit branches from said main conduit between said pressure-reducing element and said oil distribution points, said first heat exchanger being disposed in said another conduit.

7. The oil heating system according to claim 6, wherein a throttling element is provided in said another line for regulating the oil temperature before reaching said first heat exchanger.

8. The oil heating system according to claim 1, wherein said pressure-reducing element comprises a fixed throttle valve.

9. The oil heating system according to claim 2, further comprising a branch oil line extending from said main oil conduit downstream of said pressure-reducing element and said first line, a pressure relief valve in said branch line for regulating the pressure of the oil flowing into said oil distributing points.

10. The oil heating system according to claim 1, further comprising a branch oil line extending from said main oil conduit downstream of said oil distributing points, and a pressure relief valve in said branch line for regulating the pressure level of the oil lubricating points.

11. The oil heating system according to claim 4, further comprising a second line in said conduit by-passing said first heat exchanger and having a control element for regulating the flow of oil through said first heat exchanger.

12. The oil heating system according to claim 4, further comprising a return line leading from said first heat exchanger into said oil sump, a control valve in said return line for returning the oil substantially unpressurized to said oil sump.

* * * * *